(12) United States Patent
Ozcaglar et al.

(10) Patent No.: US 11,068,743 B2
(45) Date of Patent: Jul. 20, 2021

(54) FEATURE SELECTION IMPACT ANALYSIS FOR STATISTICAL MODELS

(71) Applicant: Microsoft Technology Licensing, LLC, Redmond, WA (US)

(72) Inventors: Cagri Ozcaglar, Sunnyvale, CA (US); Vijay K. Dialani, Fremont, CA (US); Sara S. Gerrard, Stanford, CA (US); Sahin C. Geyik, Redwood City, CA (US); Anish R. Nair, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 15/844,833

(22) Filed: Dec. 18, 2017

(65) Prior Publication Data
US 2019/0188531 A1 Jun. 20, 2019

(51) Int. Cl.
*G06K 9/62* (2006.01)

(52) U.S. Cl.
CPC ......... *G06K 9/6231* (2013.01); *G06K 9/6212* (2013.01); *G06K 9/6219* (2013.01); *G06K 9/6262* (2013.01)

(58) Field of Classification Search
CPC .. G06K 9/6231; G06K 9/6262; G06K 9/6212; G06K 9/6219
See application file for complete search history.

(56) References Cited

U.S. PATENT DOCUMENTS

| | | | |
|---|---|---|---|
| 2006/0230006 A1* | 10/2006 | Buscema | G06N 3/0454 706/13 |
| 2013/0151179 A1* | 6/2013 | Gray | H02J 13/0006 702/62 |

\* cited by examiner

*Primary Examiner* — Casey L Kretzer
(74) *Attorney, Agent, or Firm* — Schwegman Lundberg & Woessner, P.A.

(57) ABSTRACT

The disclosed embodiments provide a system for processing data. During operation, the system obtains a set of feature additions and an evaluation metric for assessing the performance of a statistical model. Next, the system automatically builds treatment versions of the statistical model using a set of baseline features for the statistical model and feature combinations generated using the feature additions. The system then uses a hypothesis test and a fixed set of feature values to compare a baseline value of the evaluation metric for a baseline version of the statistical model that is built using the set of baseline features with additional values of the evaluation metric for the treatment versions. Finally, the system outputs a result of the hypothesis test for use in assessing an impact of the feature combinations on a performance of the statistical model.

20 Claims, 5 Drawing Sheets

FEATURE SELECTION IMPACT ANALYSIS FOR STATISTICAL MODELS

BACKGROUND

Field

The disclosed embodiments relate to data analysis. More specifically, the disclosed embodiments relate to techniques for performing feature selection impact analysis for statistical models.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of statistical models. The discovered information may then be used to guide decisions and/or perform actions related to the data. For example, the output of a statistical model may be used to guide marketing decisions, assess risk, detect fraud, predict behavior, and/or customize or optimize use of an application or website.

However, significant time, effort, and overhead may be spent on feature selection during creation and training of statistical models for analytics. For example, a data set for a statistical model may have thousands to millions of features, including features that are created from combinations of other features, while only a fraction of the features and/or combinations may be relevant and/or important to the statistical model. At the same time, training and/or execution of statistical models with large numbers of features typically require more memory, computational resources, and time than those of statistical models with smaller numbers of features. Excessively complex statistical models that utilize too many features may additionally be at risk for overfitting.

Additional overhead and complexity may be incurred during sharing and organizing of feature sets. For example, a set of features may be shared across projects, teams, or usage contexts by denormalizing and duplicating the features in separate feature repositories for offline and online execution environments. As a result, the duplicated features may occupy significant storage resources and require synchronization across the repositories. Each team that uses the features may further incur the overhead of manually identifying features that are relevant to the team's operation from a much larger list of features for all of the teams.

Consequently, creation and use of statistical models in analytics may be facilitated by mechanisms for improving the monitoring, management, sharing, and reuse of features among the statistical models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
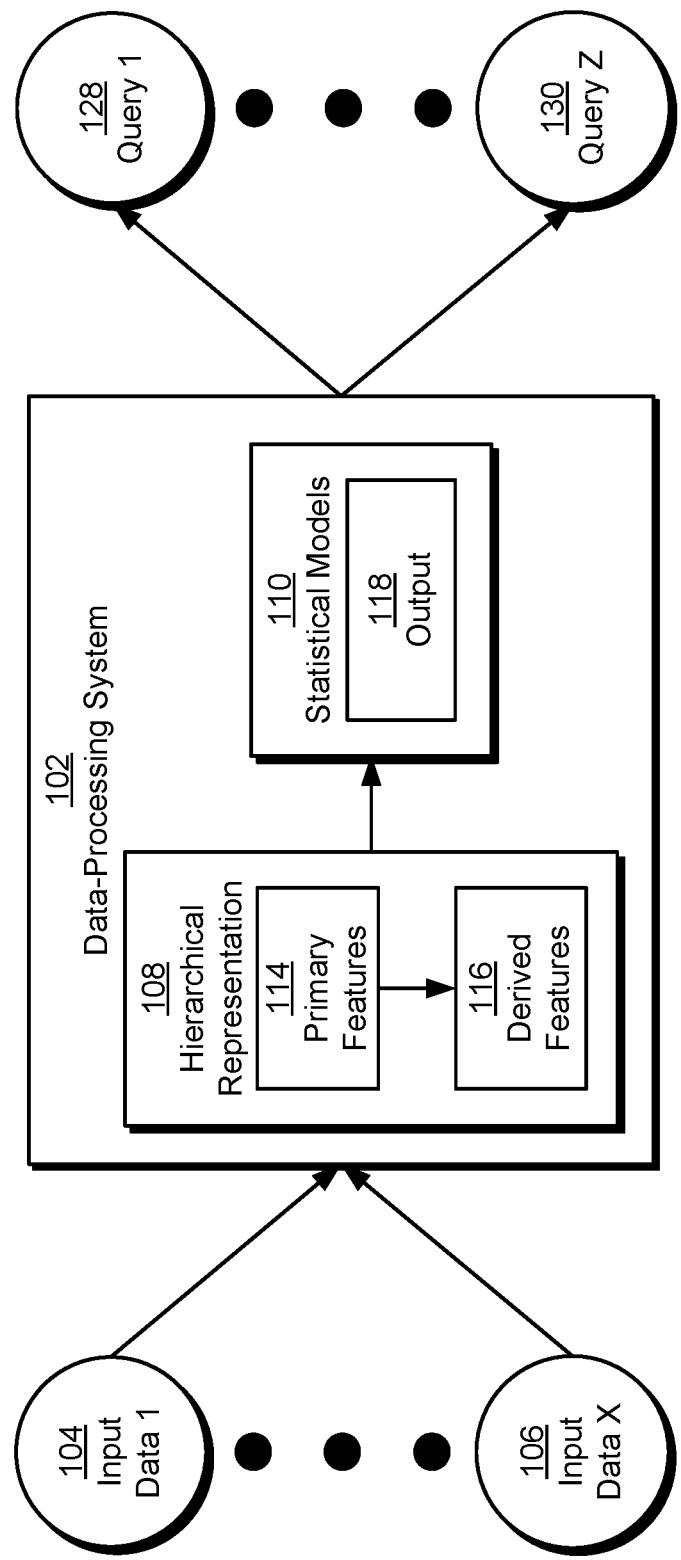
FIG. 1 shows a schematic of a system in accordance with the disclosed embodiments.

The disclosed embodiments provide a method, apparatus, and system for processing data. As shown in FIG. 1, the system includes a data-processing system 102 that analyzes one or more sets of input data (e.g., input data 1 104, input data x 106). For example, data-processing system 102 may create and train one or more statistical models 110 for analyzing input data related to users, organizations, applications, job postings, purchases, electronic devices, websites, content, sensor measurements, and/or other categories. The statistical models may include, but are not limited to, regression models, artificial neural networks, support vector machines, decision trees, naïve Bayes classifiers, Bayesian networks, deep learning models, hierarchical models, and/or ensemble models.

In turn, the results of such analysis may be used to discover relationships, patterns, and/or trends in the data;

gain insights from the input data; and/or guide decisions or actions related to the data. For example, data-processing system 102 may use the statistical models to generate output 118 that includes scores, classifications, recommendations, estimates, predictions, and/or other properties.

Output 118 may be inferred or extracted from primary features 114 in the input data and/or derived features 116 that are generated from primary features 114 and/or other derived features 116. For example, primary features 114 may include profile data, user activity, sensor data, and/or other data that is extracted directly from fields or records in the input data. The primary features 114 may be aggregated, scaled, combined, and/or otherwise transformed to produce derived features 116, which in turn may be further combined or transformed with one another and/or the primary features to generate additional derived features. After output 118 is generated from one or more sets of primary and/or derived features, output 118 is provided in responses to queries (e.g., query 1 128, query z 130) of data-processing system 102. In turn, the queried output 118 may improve revenue, interaction with the users and/or organizations, use of the applications and/or content, and/or other metrics associated with the input data.

In one or more embodiments, features 114 and/or derived features 116 are obtained and/or used with a community of users, such as an online professional network that is used by a set of entities to interact with one another in a professional, social, and/or business context. The entities may include users that use the online professional network to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

As a result, features 114 and/or derived features 116 may include member features, company features, and/or job features. The member features include attributes from the members' profiles with online professional network 118, such as each member's title, skills, work experience, education, seniority, industry, location, and/or profile completeness. The member features also include each member's number of connections in the social network, the member's tenure on the social network, and/or other metrics related to the member's overall interaction or "footprint" in the online professional network. The member features further include attributes that are specific to one or more features of the online professional network, such as a classification of the member as a job seeker or non-job-seeker.

The member features may also characterize the activity of the members with the online professional network. For example, the member features may include an activity level of each member, which may be binary (e.g., dormant or active) or calculated by aggregating different types of activities into an overall activity count and/or a bucketized activity score. The member features may also include attributes (e.g., activity frequency, dormancy, total number of user actions, average number of user actions, etc.) related to specific types of social or online professional network activity, such as messaging activity (e.g., sending messages within the social network), publishing activity (e.g., publishing posts or articles in the social network), mobile activity (e.g., accessing the social network through a mobile device), job search activity (e.g., job searches, page views for job listings, job applications, etc.), and/or email activity (e.g., accessing the social network through email or email notifications).

The company features include attributes and/or metrics associated with companies. For example, company features for a company may include demographic attributes such as a location, an industry, an age, and/or a size (e.g., small business, medium/enterprise, global/large, number of employees, etc.) of the company. The company features may further include a measure of dispersion in the company, such as a number of unique regions (e.g., metropolitan areas, counties, cities, states, countries, etc.) to which the employees and/or members of the online professional network from the company belong.

A portion of company features may relate to behavior or spending with a number of products, such as recruiting, sales, marketing, advertising, and/or educational technology solutions offered by or through the online professional network. For example, the company features may also include recruitment-based features, such as the number of recruiters, a potential spending of the company with a recruiting solution, a number of hires over a recent period (e.g., the last 12 months), and/or the same number of hires divided by the total number of employees and/or members of the online professional network in the company. In turn, the recruitment-based features may be used to characterize and/or predict the company's behavior or preferences with respect to one or more variants of a recruiting solution offered through and/or within the online professional network.

The company features may also represent a company's level of engagement with and/or presence on the online professional network. For example, the company features may include a number of employees who are members of the online professional network, a number of employees at a certain level of seniority (e.g., entry level, mid-level, manager level, senior level, etc.) who are members of the online professional network, and/or a number of employees with certain roles (e.g., engineer, manager, sales, marketing, recruiting, executive, etc.) who are members of the online professional network. The company features may also include the number of online professional network members at the company with connections to employees of the online professional network, the number of connections among employees in the company, and/or the number of followers of the company in the online professional network. The company features may further track visits to the online professional network from employees of the company, such as the number of employees at the company who have visited the online professional network over a recent period (e.g., the last 30 days) and/or the same number of visitors divided by the total number of online professional network members at the company.

One or more company features may additionally be derived features 116 that are generated from member features. For example, the company features may include measures of aggregated member activity for specific activity types (e.g., profile views, page views, jobs, searches, purchases, endorsements, messaging, content views, invitations, connections, recommendations, advertisements, etc.), member segments (e.g., groups of members that share one or more common attributes, such as members in the same location and/or industry), and companies. In turn, the company features may be used to glean company-level insights or trends from member-level online professional network data, perform statistical inference at the company and/or member segment level, and/or guide decisions related to business-to-business (B2B) marketing or sales activities.

The job features describe and/or relate to job listings and/or job recommendations within the online professional network. For example, the job features may include declared or inferred attributes of a job, such as the job's title, industry, seniority, desired skill and experience, salary range, and/or location. One or more job features may also be derived features 116 that are generated from member features and/or company features. For example, the job features may provide a context of each member's impression of a job listing or job description. The context may include a time and location (e.g., geographic location, application, website, web page, etc.) at which the job listing or description is viewed by the member. In another example, some job features may be calculated as cross products, cosine similarities, statistics, and/or other combinations, aggregations, scaling, and/or transformations of member features, company features, and/or other job features.

In one or more embodiments, data-processing system 102 uses a hierarchical representation 108 of features 114 and derived features 116 to organize the sharing, production, and use of the features across different teams, execution environments, and/or projects. Hierarchical representation 108 may include a directed acyclic graph (DAG) that defines a set of namespaces for primary features 114 and derived features 116. The namespaces may disambiguate among features with similar names or definitions from different usage contexts or execution environments. Hierarchical representation 108 may include additional information that can be used to locate primary features 114 in different execution environments, calculate derived features 116 from the primary features and/or other derived features, and track the development of statistical models or applications that accept the derived features as input.

For example, primary features 114 and derived features 116 in hierarchical representation 108 may be uniquely identified by strings of the form "[entityName].[fieldname]." The "fieldname" portion may include the name of a feature, and the "entityName" portion may form a namespace for the feature. Thus, a feature name of "skills" may be appended to namespaces such as "member," "company," and/or "job" to disambiguate between features that share the feature name but are from different teams, projects, sources, feature sets, contexts, and/or execution environments.

Figure 2:
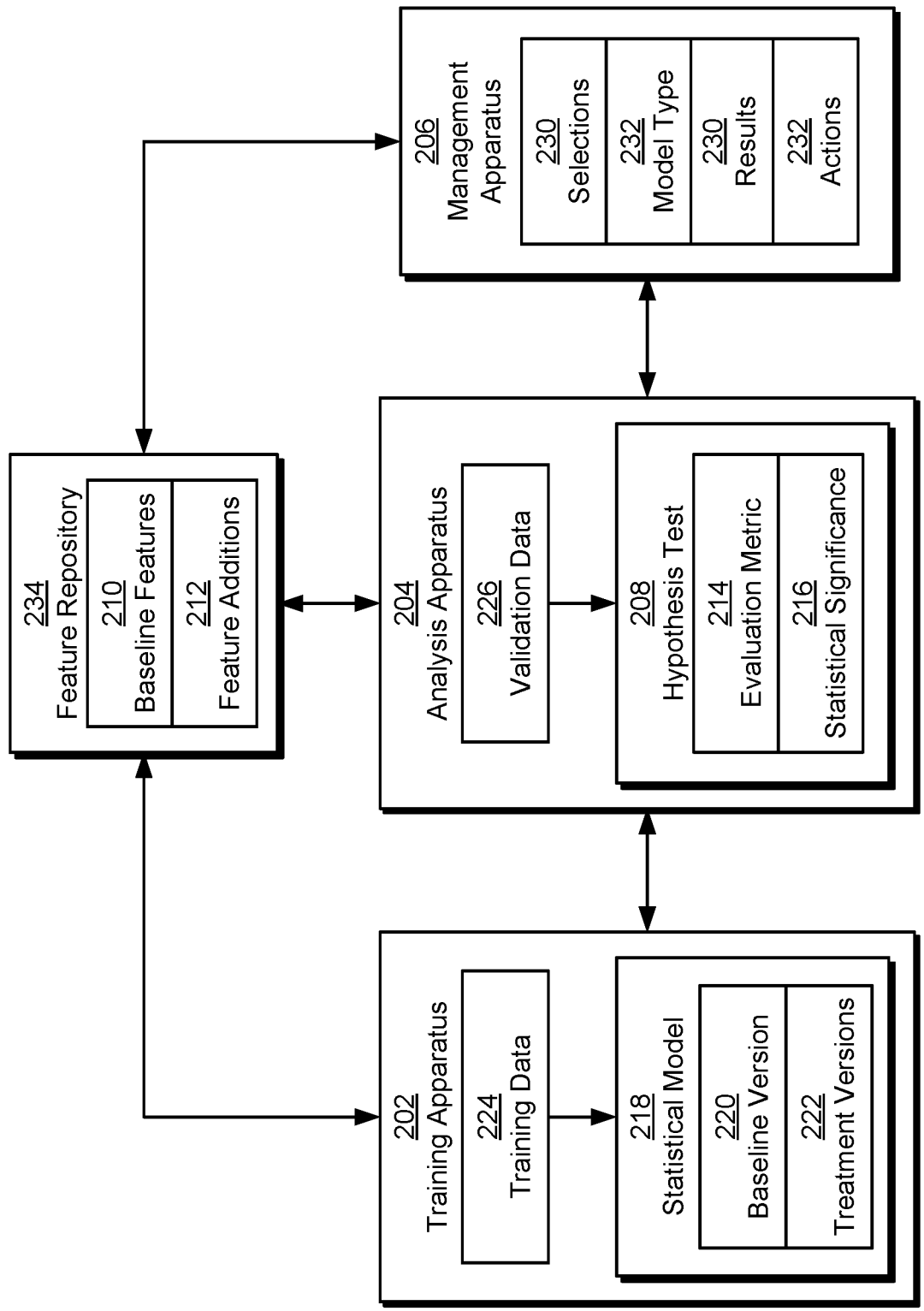
FIG. 2 shows a system for processing data in accordance with the disclosed embodiments.

In one or more embodiments, data-processing system 102 includes functionality to assess the impact of adding various combinations of primary features 114 and/or derived features 116 to statistical models 110. As shown in FIG. 2, a system for processing data (e.g., data-processing system 102 of FIG. 1) may include a training apparatus 202, an analysis apparatus 204, and a management apparatus 206. Each of these components is described in further detail below.

Management apparatus 206 includes functionality to monitor and manage a process for analyzing the impact of features on the performance of a statistical model 218. Statistical model 218 may include a regression model, artificial neural network, naïve Bayes classifier, Bayesian network, clustering technique, decision tree, random forest, gradient boosted tree, support vector machine, deep learning model, hierarchical model, ensemble model, and/or other type of machine learning model or technique.

Statistical model 218 includes a baseline version 220 that is trained and executed using a set of baseline features 210. For example, baseline version 220 may represent a currently deployed version of statistical model 218 that is used to generate scores, classifications, recommendations, estimates, predictions, and/or other inferences or properties in a live, production, or real-world environment. In turn, the output of baseline version 220 may be used to supplement or perform real-world tasks such as managing the execution of an application, personalizing user experiences, managing relationships, making clinical decisions, carrying out transactions, operating autonomous vehicles or machines, and/or analyzing metrics or measurements. In another example, baseline version 220 may include a version of statistical model 218 against which other versions of statistical model 218 are compared to determine the performance of the other versions.

Baseline features 210 and/or other features associated with statistical model 218 and/or other statistical models may be obtained from a feature repository 234 such as a relational database, graph database, data warehouse, filesystem, collection of files, cloud storage, and/or other type of data store. Values of the features may be loaded and/or stored in feature repository 234 in an online, nearline, and/or offline basis. For example, records of user activity with devices, applications, one another, and/or an online professional network may be collected and aggregated into features that are stored in feature repository 234.

At the outset of the feature-impact-analysis process, management apparatus 206 obtains selections 230 of feature additions 212 for statistical model 218. Feature additions 212 include features from feature repository 234 that are not included in baseline features 210. For example, feature additions 212 may include features that have been recently added to feature repository 234, features used with other statistical models, and/or other features that are not a part of baseline features 210.

Selections 230 may include user-specified feature names and/or other parameters for identifying feature additions 212. For example, management apparatus 206 may provide a user interface and/or other mechanism that allows a user to provide selections 230 as namespaces and/or field names in a hierarchical representation (e.g., hierarchical representation 108 of FIG. 1) of features in feature repository 234. In turn, management apparatus 206 may match the namespaces and/or field names to a set of features and include the features in feature additions 212.

Selections 230 may also, or instead, include one or more feature selection methods that identify feature additions 212 based on characteristics and/or metrics associated with features in feature repository 234. For example, a feature selection method may specify a metric such as a feature-feature correlation (i.e., a correlation coefficient between two features), feature-label correlation (i.e., a correlation between a feature and a label for statistical model 218), and/or summary statistic associated with one or more features (e.g., minimum, maximum, mean, median, variance, skew, kurtosis, etc.). The feature selection method may also specify a threshold to be applied to the metric, such as a percentile and/or value associated with the metric. In turn, features with values of the metric that meet the threshold (e.g., features with at least 0.8 Pearson correlation coefficient with other features and/or variances that are at least $80^{th}$ percentile) may be included in feature additions 212.

Management apparatus 206 may optionally obtain a model type 232 of statistical model 218 with selections 230 associated with feature additions 212. For example, management apparatus 206 may provide user-interface elements that allow a user to select model type 232 as a regression model, artificial neural network, naïve Bayes classifier, Bayesian network, clustering technique, decision tree, random forest, gradient boosted tree, support vector machine, deep learning model, hierarchical model, ensemble model, and/or other type of machine learning model or technique supported by the system. In another example, management apparatus 206 may allow a user to select and/or upload a configuration file that specifies model type 232, baseline features 210, feature additions 212, and/or other attributes used to define and/or create statistical model 218.

After feature additions 212 are identified and/or selected, training apparatus 202 uses a fixed set of training data 224 that contains baseline features 210 and feature additions 212 to build baseline version 220 and a set of treatment versions 222 of statistical model 218. For example, training data 224 may include baseline features 210 and feature additions 212 from a fixed set of records, users, and/or entities. Training data 224 may be obtained from feature repository 234 and/or another source of feature values for baseline features 210 and feature additions 212.

Treatment versions 222 include versions of statistical model 218 that are created using baseline features 210 and different combinations of feature additions 212. For example, baseline version 220 may be created using baseline features 210 in the fixed set of training data 224, while each treatment version may be created using baseline features 210 and a different feature addition in the same fixed set of training data 224. In another example, treatment versions 222 may be generated for all possible combinations of feature additions 212. In a third example, treatment versions 222 may be generated for all combinations of feature additions 212 of a fixed size (e.g., three feature additions 212 per treatment version) or up to a size limit (e.g., up to three feature additions 212 per treatment version). In a fourth example, management apparatus 206 may obtain specific feature additions 212 to be included in each treatment version of statistical model 218 from a user and/or configuration file.

Analysis apparatus 204 then uses a fixed set of validation data 226 and an evaluation metric 214 to compare the performances of baseline version 220 and treatment versions 222. Like training data 224, validation data 226 includes a fixed set of baseline features 210 and feature additions 212 used as input into the corresponding versions of statistical model 218. For example, validation data 226 may include baseline features 210 and feature additions 212 that are generated from a time interval following a previous time interval from which training data 224 was obtained. In turn, analysis apparatus 204 may obtain feature values for baseline features 210 and feature additions 212 in validation data 226 from feature repository 234 and/or another source, provide the feature values as input to the corresponding baseline version 220 and treatment versions 222, and obtain different sets of output from baseline version 220 and treatment versions 222. The output may then be compared to outcomes or labels associated with validation data 226 to calculate values of evaluation metric 214 as measurements of the performance of baseline version 220 and treatment versions 222.

For example, statistical model 218 may include a logistic regression model that predicts the likelihood that a member of an online professional network will accept a message from a recruiter. As a result, baseline features 210 and/or feature additions 212 inputted into statistical model 218 may include different combinations of member features for the members, member features for the recruiters, and/or company features for companies for which the recruiters are recruiting. Each version of statistical model 218 may be used to generate a set of scores representing predicted likelihoods of a set of members accepting messages from a set of recruiters. The members may then be ranked by descending order of score for each recruiter, and the actual number of message acceptances for the recruiter may then be determined for 1, 5, 25, and 100 members with the highest scores in the ranking. A value of evaluation metric 214 for that version of statistical model 218 may then be calculated as the average percentage or proportion of message acceptances for each pre-specified number (e.g., 1, 5, 25, 100) of highest-scored members. Thus, if recruiter messages are accepted by an average of 2 out of the top 25 members as scored by a version of statistical model 218, evaluation metric 214 for that version may be $2/25$, or 0.08.

In one or more embodiments, analysis apparatus 204 uses a hypothesis test 208 to determine a statistical significance 216 associated with differences in evaluation metric 214 between baseline version 220 and treatment versions 222. For example, hypothesis test 208 may be a paired t-test and/or other type of paired difference test that determines if differences in values of evaluation metric 214 between baseline version 220 and each treatment version of statistical model 218 are statistically significant (e.g., if the difference has a p-value of less than 0.05 or 0.01).

To facilitate the use of hypothesis test 208 in comparing the performances of treatment versions 222 with that of baseline version 220, analysis apparatus 204 may select an amount of validation data 226 that allows statistical significance 216 to be determined from the corresponding values of evaluation metric 214. For example, analysis apparatus 204 may select a time interval spanned by validation data 226 based on the quantity of baseline features 210 and feature additions 212 generated over time, as well as the amount of output from different versions of statistical model 218 required to produce statistically significant results 230 for a given hypothesis test 208.

After hypothesis test 208 is complete, management apparatus 206 outputs results 230 of hypothesis test 208 and/or performs actions 232 based on results 230. For example, management apparatus 206 may display and/or otherwise output tables, spreadsheets, line charts, bar charts, histograms, pie charts, files, messages, notifications, and/or other representations of results 230 that include values of evaluation metric 214 for baseline version 220 and treatment versions 222, and the corresponding values of statistical significance 216 (e.g., p-values) associated with differences in evaluation metric 214 between baseline version 220 and treatment versions 222.

Management apparatus 206 may also identify baseline features 210, feature additions 212, and/or feature values inputted into each version of statistical model 218, as well as the corresponding output of the version and/or outcomes associated with the feature values. When a treatment version of statistical model 218 has a statistically significant improvement in performance over baseline version 220, management apparatus 206 may automatically add one or more feature additions 212 included in the treatment version to baseline features 210 and replace baseline version 220 with the treatment version (e.g., in a production, live, and/or real-world setting).

Training apparatus 202, analysis apparatus 204, and management apparatus 206 may continue managing and/or analyzing the impact of features in feature repository 234 on the performance of statistical model 218. For example, the system of FIG. 2 may use sliding windows of training data 224 and validation data 226 to generate multiple versions of statistical model 218 from new and/or existing features in feature repository 234, compare values of evaluation metric 214 for the versions using hypothesis test 208, and use values of statistical significance 216 associated with the comparisons to determine results 230 of hypothesis test 208 and update baseline features 210 accordingly.

By continuously monitoring and assessing the impact of different sets of features (e.g., baseline features 210, feature additions 212, etc.), the system of FIG. 2 may identify features that improve the performance of statistical model 218 without requiring manual user intervention in selecting new features for statistical model 218, thereby streamlining the feature selection and/or feature engineering process for statistical model 218. In turn, the system may automatically update the set of features used with statistical model 218 and improve the performance of statistical model 218 over time. The system may further evaluate the performance of different versions of statistical model 218 using offline or historical data instead of requiring extensive online hypothesis testing of the versions, thus reducing risk associated with introducing model changes into live, production, or real-world environments. Consequently, the system of FIG. 2 may be an automated end-to-end system that improves the performance and use of statistical models and/or feature-monitoring technologies without requiring manual user intervention, as well as the performance and use of applications, distributed systems, computer systems, and/or other platforms that use or leverage statistical models and/or features.

Those skilled in the art will appreciate that the system of FIG. 2 may be implemented in a variety of ways. First, training apparatus 202, analysis apparatus 204, management apparatus 206, and/or feature repository 234 may be provided by a single physical machine, multiple computer systems, one or more virtual machines, a grid, one or more databases, one or more filesystems, and/or a cloud computing system. Training apparatus 202, analysis apparatus 204, and management apparatus 206 may additionally be implemented together and/or separately by one or more hardware and/or software components and/or layers. Moreover, various components of the system may be configured to execute in an offline, online, and/or nearline basis to perform different types of processing related to management and monitoring of features, feature sets, and statistical models.

Second, baseline features 210, feature additions 212, training data 224, validation data 226, and/or other data used by the system may be stored, defined, and/or transmitted using a number of techniques. For example, the system may be configured to accept features from different types of repositories, including relational databases, graph databases, data warehouses, filesystems, and/or flat files. The system may also obtain and/or transmit feature names, feature namespaces, feature sources, feature values, and/or other data used to monitor or manage features and/or feature distributions in a number of formats, including database records, property lists, Extensible Markup language (XML) documents, JavaScript Object Notation (JSON) objects, and/or other types of structured data.

Third, various techniques may be used to analyze and/or manage the impact of features in feature repository 234 on the performance of statistical model 218. For example, other types of parametric and/or nonparametric hypothesis tests may be used to compare values of evaluation metric 214 among baseline version 220 and treatment versions 222 of statistical model 218. In another example, one or more features may be removed from baseline version 220 when analysis apparatus 204 and/or hypothesis test 208 determine that the feature(s) are negatively impacting the performance of statistical model 218. In a third example, a new set of baseline features 210 for a new version of statistical model 218 may be selected by performing multiple rounds of comparisons with different treatment versions 222 of statistical model 218. During each round, the highest-performing treatment versions 222 may be identified, and groups of feature additions 212 used with the identified treatment versions 222 may be merged, separated, and/or rearranged to generate a new set of treatment versions 222 in the next round for further evaluation of the impact of feature additions 212 on the performance of statistical model 218.

Figure 3:
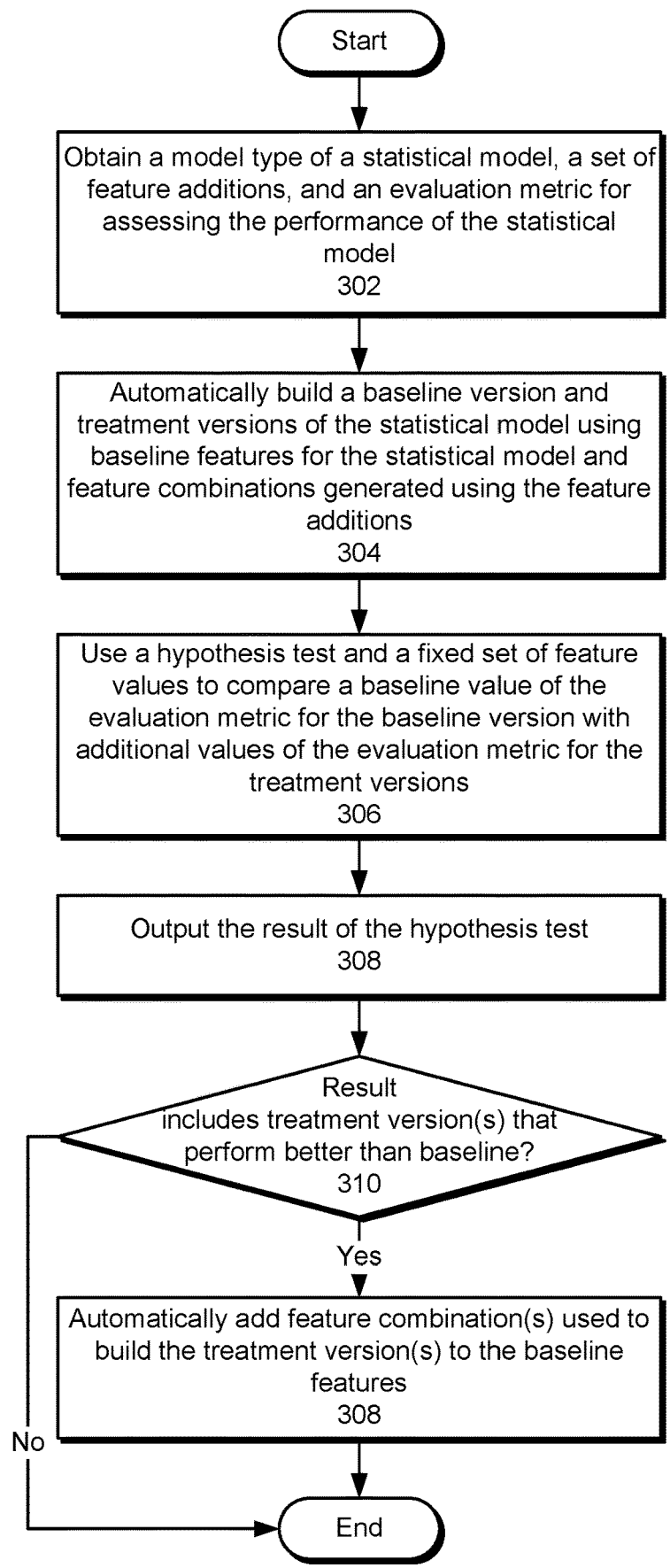
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a model type of a statistical model, a set of feature additions, and an evaluation metric for assessing the performance of the statistical model are obtained (operation 302). For example, a user may specify the model type, feature additions, and evaluation metric through a user interface, configuration file, and/or other communications mechanism. In another example, the feature additions may be obtained as one or more new features from a feature repository, such as feature repository 234 of FIG. 2. In a third example, a statistical model of a given model type may be selected in lieu of the model type. In a fourth example, some or all of the feature additions may be identified using one or more feature selection methods. Each feature selection method may include a metric such as a feature-feature correlation, a feature-label correlation, and/or a variance associated with one or more features. The feature selection method may also include a threshold and/or other criterion for filtering features by the metric.

Next, a baseline version and treatment versions of the statistical model are automatically built using baseline features for the statistical model and feature combinations generated using the feature additions (operation 304). Each treatment version of the statistical model may include baseline features that are used with the baseline version, as well as a feature combination that includes some or all feature additions specified in operation 302.

For example, different feature combinations may be generated from different numbers or subsets of feature additions. The number of features in each feature combination may be fixed, limited, or unlimited (e.g., up to the total number of feature additions obtained in operation 302). Thus, the feature combinations may be used to enumerate all possible combinations of the feature additions or a subset of all possible combinations of the feature additions.

Alternatively, specific feature combinations to be used with different treatment versions of the statistical model may be specified with the feature additions. For example, the feature combinations may be obtained as distinct sets of feature additions in operation 302, with each set of feature additions used to generate a different treatment version of the statistical model.

To facilitate fair comparison of statistical model performance across different versions of the statistical model, a fixed set of training data containing the baseline features and feature additions is used to train the baseline version and treatment versions of the statistical model. For example, a fixed number of records containing the baseline features and feature additions may be obtained, and data in the records may be used to create the baseline version and treatment versions of the statistical model. Thus, the baseline version and treatment versions may be created using different sets of fields from the same set of records.

After the baseline version and treatment versions of the statistical model are created, a hypothesis test and a fixed set of feature values are used to compare values of the evaluation metric for the treatment versions with a baseline value of the evaluation metric for the baseline version (operation 306), as described in further detail below with respect to FIG. 4. A result of the hypothesis test is also outputted (operation 308). For example, the result may be displayed, exported, saved, and/or otherwise provided to a user in a table, spreadsheet, visualization, user interface, file, notification, email, and/or message.

The result may include one or more treatment versions of the statistical model that perform better than the baseline version (operation 310). For example, the result may indicate that the treatment version(s) are better at predicting outcomes associated with the statistical model than the baseline version. In turn, one or more feature combinations used to build the treatment version(s) may be automatically added to the baseline features (operation 308) to improve the performance and evolution of the statistical model. Operation 310 may be omitted if no treatment versions perform better than the baseline version.

Figure 4:
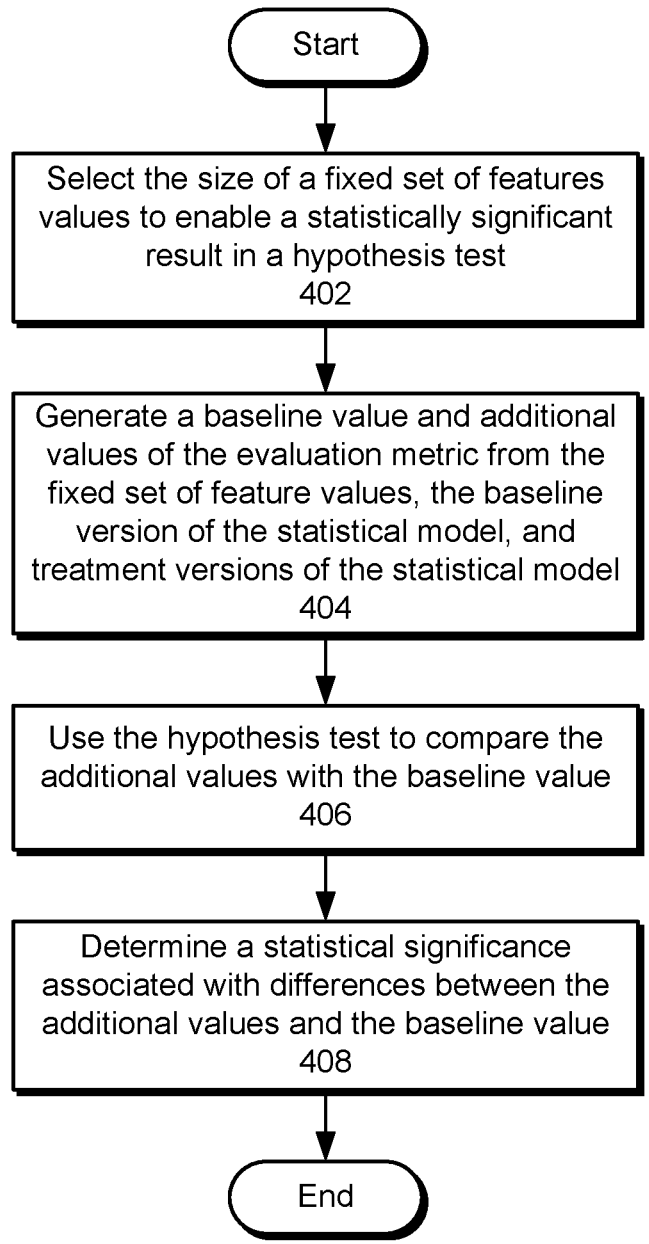
FIG. 4 shows a flowchart illustrating a process of performing feature selection impact analysis for a statistical model in accordance with the disclosed embodiments.

FIG. 4 shows a flowchart illustrating a process of performing feature selection impact analysis for a statistical model in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, the size of a fixed set of feature values is selected to enable a statistically significant result in a hypothesis test (operation 402). For example, a fixed number of records may be obtained as validation data for the statistical model, with the number of records and/or a time window spanned by the records selected to allow the result of the hypothesis test to be statistically significant.

Next, a baseline value and additional values of an evaluation metric are generated from the fixed set of feature values, a baseline version of the statistical model, and treatment versions of the statistical model (operation 404). For example, the evaluation metric may be calculated as a click-through-rate (CTR) lift, receiver operating characteristic (ROC) area under the curve (AUC), observed/expected (O/E) ratio, and/or other performance metric for the statistical model. The baseline value may be obtained from the baseline version using the fixed set of feature values for the baseline features, and the additional values may be obtained from the treatment versions using the fixed set of features for the baseline features and the corresponding feature combinations.

The hypothesis test is then used to compare the additional values with the baseline value (operation 406) and/or one another, and a statistical significance associated with differences between the additional values and the baseline value is determined (operation 408). For example, the hypothesis test may be a paired difference test such as a paired samples t-test that determines if the difference in performance between the baseline version and a treatment version (or two treatment versions), as represented by corresponding values of the evaluation metric, is statistically significant. The hypothesis test may generate a p-value that is compared to a significance level; when the p-value is lower than the significance value, the difference is statistically significant. In turn, treatment versions of the statistical model that have statistically significant improvements in performance over the baseline version may be used to update the features of the baseline version and/or statistical model, as discussed above.

Figure 5:
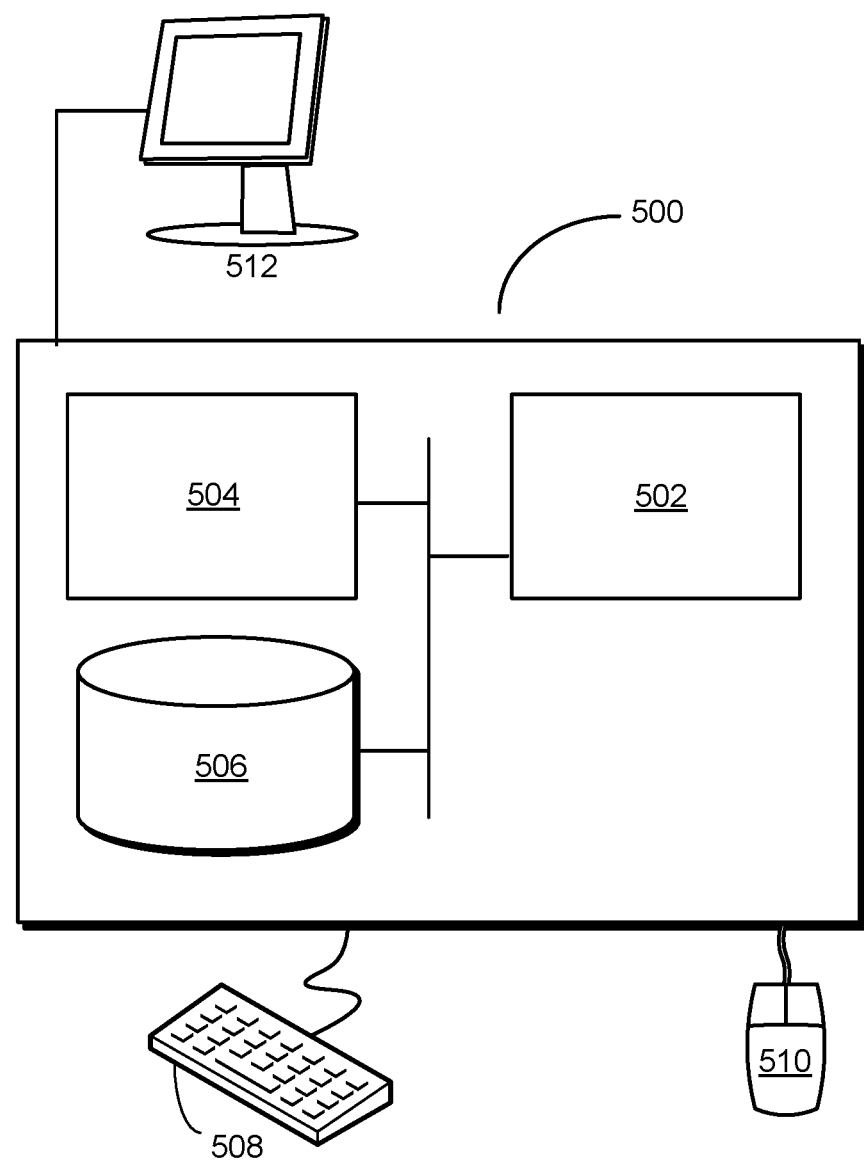
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include a training apparatus, an analysis apparatus, and a management apparatus, one or more of which may alternatively be termed or implemented as a module, mechanism, or other type of system component. The training apparatus obtains a set of feature additions and an evaluation metric for assessing a performance of a statistical model and automatically build treatment versions of the statistical model using a set of baseline features for the statistical model and feature combinations generated using the set of feature additions. Next, the analysis apparatus uses a hypothesis test and a fixed set of feature values to compare a baseline value of the evaluation metric for a baseline version of the statistical model that is built using the set of baseline features with additional values of the evaluation metric for the treatment versions. The management apparatus then outputs a result of the hypothesis test for use in assessing an impact of the feature combinations on a performance of the statistical model.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a set of feature additions and an evaluation metric for assessing a performance of a statistical model;
    automatically building, by one or more computer systems, treatment versions of the statistical model using a set of baseline features for the statistical model and feature combinations generated using the set of feature additions;
    using a hypothesis test and a fixed set of feature values to compare, by the one or more computer systems, a baseline value of the evaluation metric for a baseline version of the statistical model that is built using the set of baseline features with additional values of the evaluation metric for the treatment versions; and outputting a result of the hypothesis test for use in assessing an impact of the feature combinations on a performance of the statistical model.

2. The method of claim 1, further comprising:
when the result comprises a treatment version of the statistical model with an improvement in performance over the baseline version, automatically adding to the set of baseline features a feature combination used to build the treatment version.

3. The method of claim 1, wherein obtaining the set of feature additions for the statistical model comprises:
obtaining a selection of one or more feature additions from a user.

4. The method of claim 1, wherein obtaining the set of feature additions for the statistical model comprises:
using a feature selection method to generate the set of feature additions.

5. The method of claim 4, wherein the feature selection method comprises at least one of:
a feature-label correlation;
a feature-feature correlation; and
a variance.

6. The method of claim 1, wherein automatically building the treatment versions of the statistical model comprises:
building the treatment versions of the statistical model from all possible combinations generated from the set of feature additions.

7. The method of claim 1, wherein automatically building the treatment versions of the statistical model comprises:
using a fixed set of training data to build the treatment versions and the baseline version of the statistical model.

8. The method of claim 1, wherein using the hypothesis test and the fixed set of feature values to compare the baseline value of the evaluation metric with the additional values of the evaluation metric comprises:
using the baseline version and the fixed set of feature values for the baseline features to generate the baseline value of the evaluation metric;
using the treatment versions and the fixed set of feature values for the baseline features and the feature combinations to generate the additional values of the evaluation metric;
using the hypothesis test to compare the additional values with the baseline value; and
determining a statistical significance associated with differences between the additional values and the baseline value.

9. The method of claim 8, wherein the result of the hypothesis test comprises a treatment version of the statistical model with a statistically significant improvement in performance over the baseline version.

10. The method of claim 1, further comprising:
obtaining a model type of the statistical model with the set of feature additions and the evaluation metric.

11. The method of claim 1, wherein obtaining the set of feature additions for the statistical model comprises:
obtaining the set of feature additions as new features added to a feature repository.

12. The method of claim 1, wherein the hypothesis test comprises a paired t-test.

13. A system, comprising:
one or more processors; and
memory storing instructions that, when executed by the one or more processors, cause the system to:
obtain a set of feature additions and an evaluation metric for assessing a performance of a statistical model;
automatically build treatment versions of the statistical model using a set of baseline features for the statistical model and feature combinations generated using the set of feature additions;
use a hypothesis test and a fixed set of feature values to compare a baseline value of the evaluation metric for a baseline version of the statistical model that is built using the set of baseline features with additional values of the evaluation metric for the treatment versions; and
output a result of the hypothesis test for use in assessing an impact of the feature combinations on a performance of the statistical model.

14. The system of claim 13, wherein the memory further stores instructions that, when executed by the one or more processors, cause the system to:
automatically add to the set of baseline features a feature combination used to build the treatment version when the result comprises a treatment version of the statistical model with an improvement in performance over the baseline version.

15. The system of claim 13, wherein obtaining the set of feature additions for the statistical model comprises at least one of:
obtaining a selection of one or more feature additions from a user;
using a feature selection method to generate the set of feature additions; and
obtaining the set of feature additions as new features added to a feature repository.

16. The system of claim 15, wherein the feature selection method comprises at least one of:
a feature-label correlation;
a feature-feature correlation; and
a variance.

17. The system of claim 13, wherein using the hypothesis test and the fixed set of feature values to compare the baseline value of the evaluation metric with the additional values of the evaluation metric comprises:
using the baseline version and the fixed set of feature values for the baseline features to generate the baseline value of the evaluation metric;
using the treatment versions and the fixed set of feature values for the baseline features and the feature combinations to generate the additional values of the evaluation metric;
using the hypothesis test to compare the additional values with the baseline value; and
determining a statistical significance associated with differences between the additional values and the baseline value.

18. The system of claim 13, wherein the memory further stores instructions that, when executed by the one or more processors, cause the system to:
obtain the set of feature additions as new features added to a feature repository.

19. A non-transitory computer-readable storage medium storing instructions that when executed by a computer cause the computer to perform a method, the method comprising:
obtaining a set of feature additions and an evaluation metric for assessing a performance of a statistical model;

automatically building treatment versions of the statistical model using a set of baseline features for the statistical model and feature combinations generated using the set of feature additions;

using a hypothesis test and a fixed set of feature values to compare a baseline value of the evaluation metric for a baseline version of the statistical model that is built using the set of baseline features with additional values of the evaluation metric for the treatment versions; and outputting a result of the hypothesis test for use in assessing an impact of the feature combinations on a performance of the statistical model.

20. The non-transitory computer-readable storage medium of claim 19, wherein using the hypothesis test and the fixed set of feature values to compare the baseline value of the evaluation metric with the additional values of the evaluation metric comprises:

using the baseline version and the fixed set of feature values for the baseline features to generate the baseline value of the evaluation metric;

using the treatment versions and the fixed set of feature values for the baseline features and the feature combinations to generate the additional values of the evaluation metric;

using the hypothesis test to compare the additional values with the baseline value; and determining a statistical significance associated with differences between the additional values and the baseline value.

\* \* \* \* \*